No. 764,519. PATENTED JULY 5, 1904.
N. CRANE.
VEHICLE TIRE.
APPLICATION FILED AUG. 7, 1902.
NO MODEL. 2 SHEETS—SHEET 1.
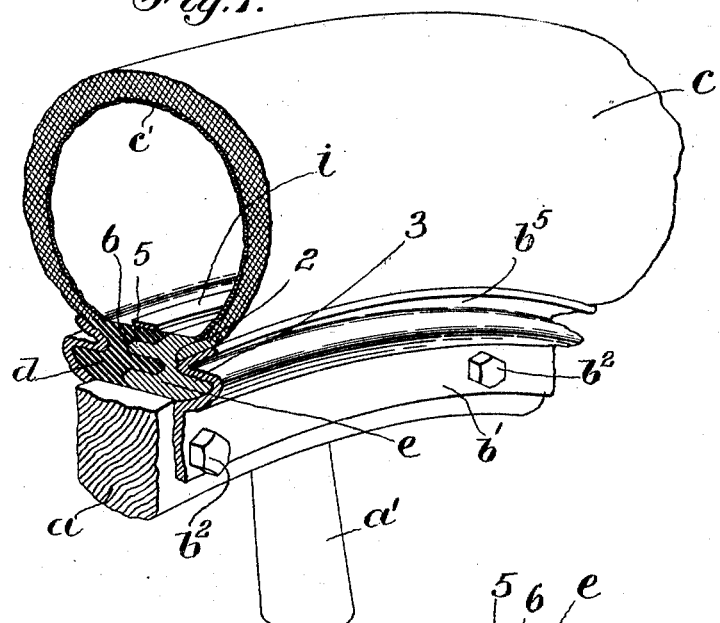
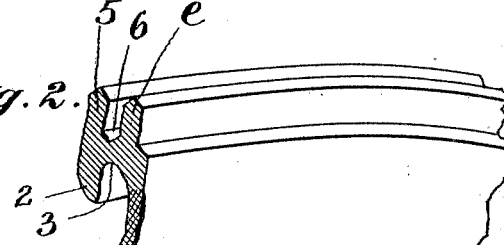
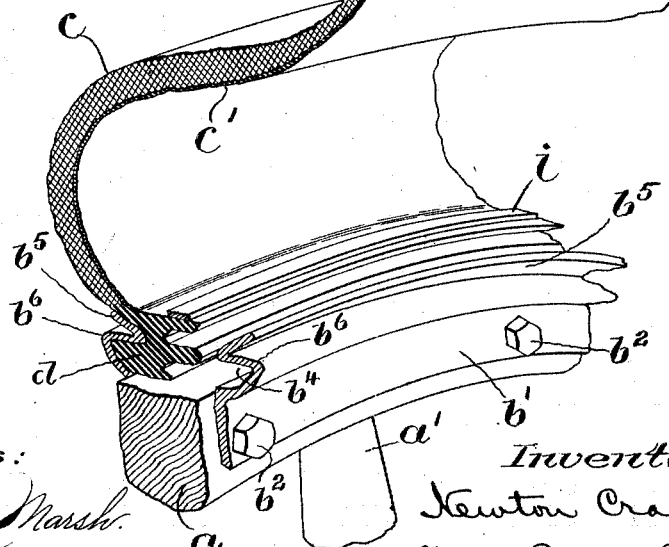
Witnesses: Inventor,
Henry Marsh. Newton Crane,
E. Batchelder by Wright Brown & Quinby
His Attorneys.

No. 764,519. PATENTED JULY 5, 1904.
N. CRANE.
VEHICLE TIRE.
APPLICATION FILED AUG. 7, 1902.
NO MODEL. 2 SHEETS—SHEET 2.
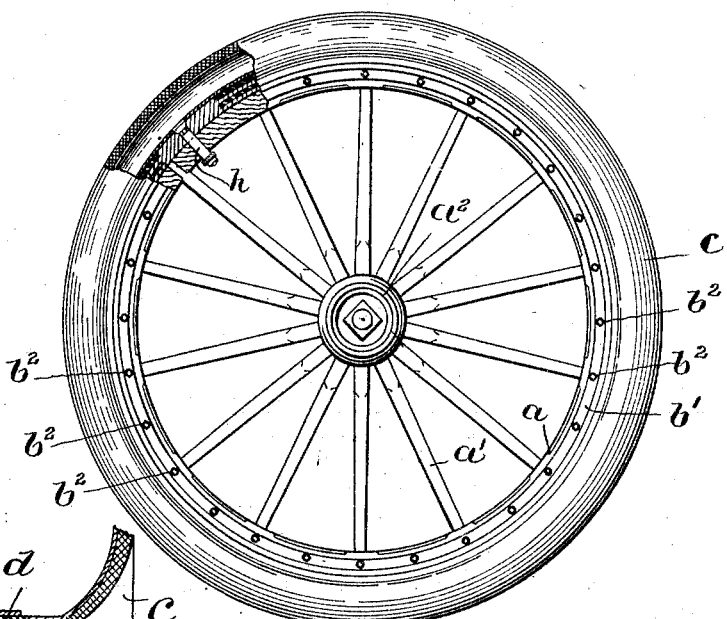
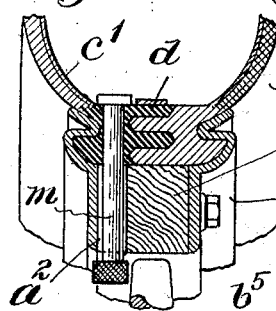
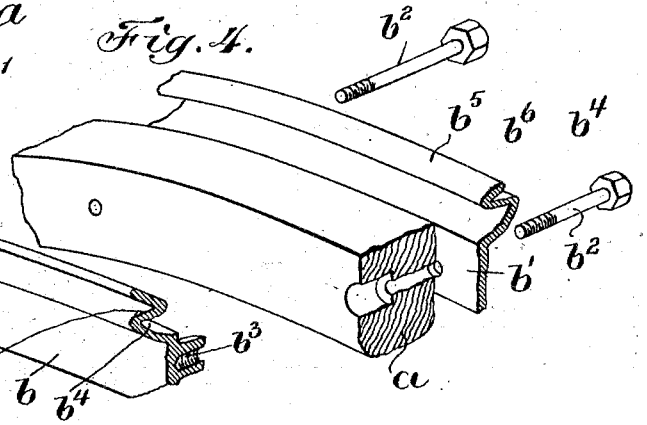
Witnesses:
F. Henry Marsh
E. Batchelder
Inventor,
Newton Crane
by Wright, Brown, Quinby
his Attorneys No. 764,519. Patented July 5, 1904.

UNITED STATES PATENT OFFICE.

NEWTON CRANE, OF BOSTON, MASSACHUSETTS.

VEHICLE-TIRE.

SPECIFICATION forming part of Letters Patent No. 764,519, dated July 5, 1904.

Application filed August 7, 1902. Serial No. 118,732. (No model.)

*To all whom it may concern:*

Be it known that I, NEWTON CRANE, of Boston, in the county of Suffolk and State of Massachusetts, have invented certain new and useful Improvements in Vehicle-Tires, of which the following is a specification.

This invention has relation to vehicle-tires of the pneumatic type, and has for its object to provide a tire which shall have the advantageous features of both a single-tube tire and a double-tube tire without the disadvantageous features of either of them—that is to say, the object of the invention is to provide a tire which consists of a single tube capable of receiving air under pressure and having overlapping or interlocking longitudinal meeting edges, whereby a tire may be removed from the vehicle-rim and its meeting edges separated to permit access to the interior for the purpose of repairing cuts, abrasions, or punctures which extend into the interior of the tube, just as the outer tube or covering may be removed and opened in the case of a double-tube tire.

On the accompanying drawings, Figure 1 illustrates in perspective view and partially in section a portion of a vehicle-wheel with my improved tire attached thereto. Fig. 2 represents another view of the same with one of the meeting edges of the tire dislocated for the purpose of permitting access to the interior of the tire. Fig. 3 represents a vehicle-wheel with the tire and rim partially in section for the purpose of illustrating the valve and the formation of the tire at the point where the valve is applied. Fig. 4 illustrates in detached positions the vehicle rim or felly with the clamping members for holding the tire in place. Fig. 5 represents one manner of attaching the valve.

My improved tire is illustrated as specially adapted for wooden wheels, and I shall describe means for attaching it to wheels of that character; but it will be understood at the outset that there is no intention of limiting the invention to any particular form of wheel and that it may be employed in connection with metallic wheels with equal facility and without departing from the spirit and scope of the present invention. It will furthermore be understood that the invention is capable of embodiment in other forms, so that I do not limit myself to the particular forms shown nor employ the descriptive terms which I shall hereinafter use as limitations.

On the accompanying drawings, $a$ indicates the rim or felly of a vehicle-wheel having the spokes $a'$ and the hub $a^2$. The periphery of the felly may be either plane or concave in section, and it affords a base or support for the inner portion of the tire. To the faces of the felly are secured the metallic clamps $b$ $b'$ by means of headed screws $b^2$, passed laterally through the felly into threaded sockets $b^3$ or holes $b^{31}$, as best shown in Fig. 4. Each of the "clamps" or "clamping members," as I term them, is bent outward and then inward to provide a groove or socket $b^4$. The under wall of the groove, or that wall which is nearer the hub, is curved, as shown in Fig. 5, and registers with the top or outer surface of the felly. The edge of the clamp is bent outwardly, as illustrated at $b^5$, to afford an additional support for the tire. The walls $b^5$ $b^6$ form a reëntrant lock for engaging a recess in the tire.

The tire itself consists of a band formed of any suitable material, such as layers of rubber and duck vulcanized together, as indicated at $c$. The inner surface of the band is preferably formed of a layer of rubber, as indicated at $c'$. The band graduates in thickness from the edges toward the center, as is commonly the case with the outer tube of the double-tube tire.

In the form of the invention illustrated in Figs. 1 and 2 the band is provided with two "meeting edges," as I term them, indicated at $d$ and $e$. These meeting edges are provided with alternate tongues and grooves, so as to interlock or overlap, as it were, as shown in Fig. 1, the edge $d$ being formed of relatively hard material and the edge $e$ being formed of relatively soft material. It is not essential that the edge $d$ should be formed of material that is unyielding, the purpose being to form the two edges in such way that one will be softer than the other, so as to be compressible into the grooves formed therein, and consequently the edge $e$ may be formed of soft rubber. Each of the meeting edges of the tire is formed with a groove 2 to receive the reëntrant locking portion of the clamping member and with a flange or tongue 3 to extend into the groove $b^4$ of the said clamp. The meeting edges are separable except at a small portion of the tire, as illustrated in Fig. 3, where they may be vulcanized together for the purpose of receiving the valve, which is indicated as a whole at $h$, although this is not essential, since the valve may be placed to one side and passed through the side wall of the tire. As shown in Fig. 3, however, the valve $h$ extends through the felly or rim of the wheel and is provided with the usual nipple, the construction of which it is unnecessary here to describe. I prefer the construction shown in Fig. 5, however, as it obviates the necessity of vulcanizing the meeting edges together at any point. In this instance the rim or felly $a$ of the wheel is provided on one side with a radial groove $a^2$ for the reception of the valve $m$, which extends through the relatively hard material forming the edge $d$ of the tire. The result of this construction is that by removing one of the clamps the tire may be removed laterally from the wheel with ease and facility.

The tire is placed upon the wheel by removing one of the clamps, and the meeting edges are brought into contact, with the tongues 5 of one edge entering the sockets 6 of the other edge. The clamp is then secured upon the wheel so as to force or wedge the two edges tightly together, the relatively soft material of one edge being firmly pressed against the relatively hard material of the other edge, so as to preclude the escape of air. The tire is then inflated and is ready for use, the pressure of air in the tube serving to more firmly unite the overlapping or locking portions of the edges.

By providing the relatively soft material at the juncture of the meeting edges said material may be crowded against the other edge in such manner as to effectually prevent the escape of air.

In the event of the employment of the relatively hard material on one edge and the relatively soft material on the other edge the tongue or tongues formed of the soft material may be somewhat larger than the grooves which they are to occupy, so that when they are crowded into said grooves their tendency to expand still further assists in preventing the escape of air.

If desired, a band 5, of any suitable material, may be placed in the tire, as shown in Figs. 1, 2, and 3. This band may be either of metal, canvas, or rubber composition, and it serves the purpose of preventing the overlapping portions of the edges from being spread apart.

The advantages of a tire of this character are patent, and it is unnecessary to enumerate them more than has heretofore been done.

Having thus explained the nature of the invention and described a way of constructing and using the same, although without attempting to set forth all of the forms in which it may be made or all of the modes of its use, I declare that what I claim is—

1. An inflatable tire consisting of an endless band in tubular form, one of the longitudinal edges of said band being relatively hard with a groove therein and the other of said edges being provided with a relatively soft or yielding material adapted to be cramped into the said groove to effect a closure of the tire and the prevention of the escape of air.

2. An inflatable tire consisting of an endless band in tubular form whose meeting edges are provided with relatively deep complemental teeth and grooves, one of said meeting edges being formed of relatively soft material and the other of relatively harder material, in combination with a rim having external clamps for compressing said meeting edges together.

In testimony whereof I have affixed my signature in presence of two witnesses.

NEWTON CRANE.

Witnesses:
MARCUS B. MAY,
E. BATCHELDER.